(12) United States Patent
Ito

(10) Patent No.: US 6,640,016 B1
(45) Date of Patent: Oct. 28, 2003

(54) METHOD, APPARATUS AND RECORDING MEDIUM FOR IMAGE PROCESSING

(75) Inventor: Wataru Ito, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/347,396

(22) Filed: Jul. 6, 1999

(30) Foreign Application Priority Data

Jul. 6, 1998 (JP) .......................................... 10-190215
Apr. 22, 1999 (JP) .......................................... 11-114797

(51) Int. Cl.$^7$ ................................................ G06K 9/40
(52) U.S. Cl. ...................... 382/263; 382/254; 382/260
(58) Field of Search ................................ 382/254, 260, 382/263, 266, 269, 275

(56) References Cited

U.S. PATENT DOCUMENTS 5,867,606 A * 2/1999 Tretter ........................ 382/261
5,907,642 A * 5/1999 Ito .............................. 382/302

* cited by examiner

*Primary Examiner*—Thomas D. Lee
(74) *Attorney, Agent, or Firm*—Birch, Stewart, Kolasch & Birch, LLP

(57) ABSTRACT

When sharpness processing is carried out on image data coded after being decomposed into multiple resolution spaces and attached with sharpness processing information regarding a highest resolution image, appropriate sharpness processing can also be carried out on image data at an intermediate resolution. A coded image file storing data having been coded after being decomposed into multiple resolution spaces is stored in an image server together with information regarding sharpness processing to be carried out on the highest resolution image. Coded image data at an intermediate resolution are read from the coded image file, and decompressed by decompression means to obtain restored image data. Parameter setting means sets a parameter for sharpness processing to be carried out on the restored image data, based on the information and the resolution of the coded image data. Sharpness processing is carried out by sharpness processing means on the restored image data based on the parameter, and the processed image data are reproduced by reproduction means.

9 Claims, 4 Drawing Sheets

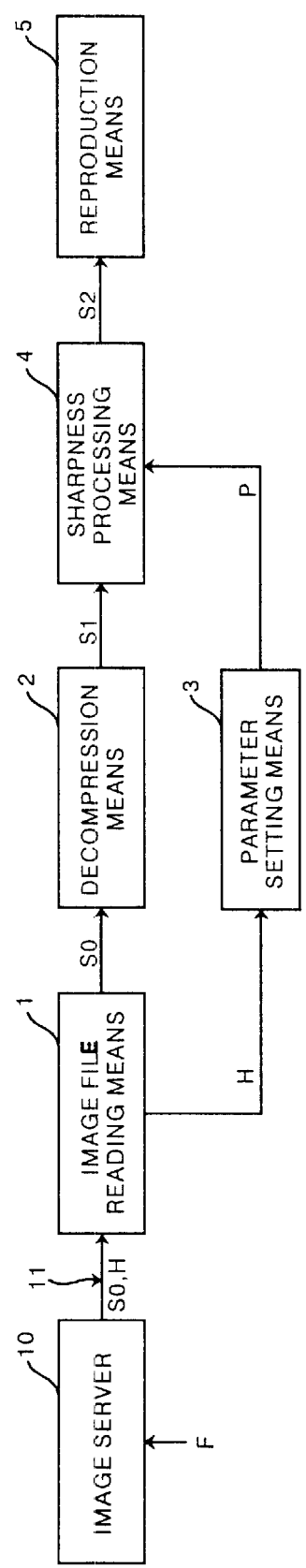

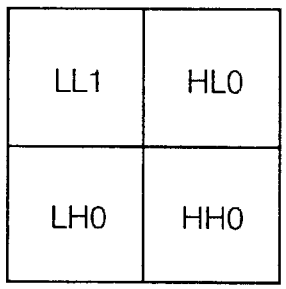 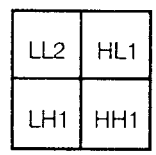 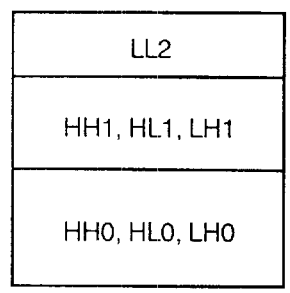
FIG.2a  FIG.2b  FIG.2c
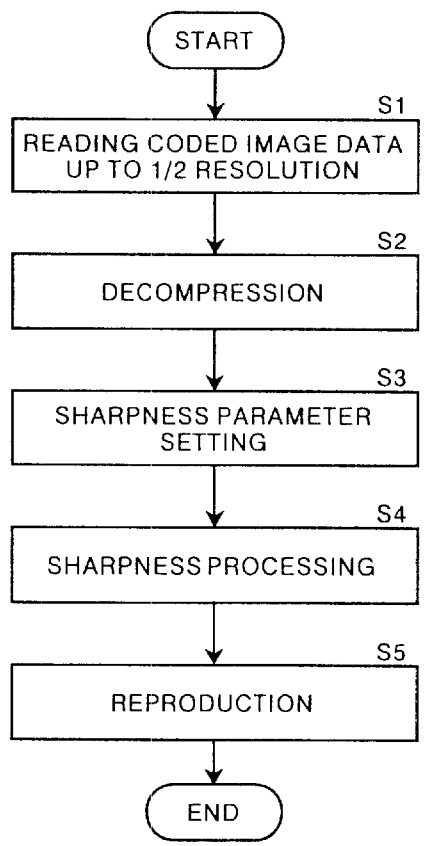
FIG.3

FREQUENCY (FULL-SIZE IMAGE)

FREQUENCY (1/2 IMAGE)

FREQUENCY (RESPONSE SHORTAGE)

METHOD, APPARATUS AND RECORDING MEDIUM FOR IMAGE PROCESSING

BACKGROUND OF THE INVENTION

1. Field of the Invention

The present invention relates to an image processing method and an image processing apparatus for carrying out sharpness processing on image data at a desired resolution out of multiple-resolution image data obtained by converting image data into multiple resolution spaces, and also to a computer-readable recording medium storing a program for causing a computer to execute the image processing method.

2. Description of the Related Art

Various kinds of formats for storing image data, such as JPEG, GIF, and TIFF have been known. According to another format proposed recently, image data are stored in a hierarchy based on resolution or density resolution and data at each level of the hierarchy (hierarchical data) are stored after coding and compression thereof. More specifically, according to this storage format, image data are decomposed into hierarchical data according to multiple resolutions or density resolutions through wavelet transform or the like carried out thereon, and the hierarchical data at each resolution or density resolution are coded and compressed according to the hierarchy and saved in a file.

This storage format has the following characteristics:

(1) Unlike a DCT (Discrete Cosine Transform) method used in the conventional JPEG format, no artifacts such as block distortion are created, since image data are not processed in blocks.

(2) Only resolution information which is necessary upon transfer of image data needs to be transferred, since the image data have been coded hierarchically. This enables efficient image transfer.

(3) Various kinds of image processing such as frequency enhancing processing can be carried out comparatively easily, since image data are decomposed into data at multiple resolutions or multiple density resolutions.

(4) Simultaneous decomposition of color space and frequency according to multiple-resolution analysis is possible. In a low frequency range wherein coding efficiency is greatly affected, an orthogonal transform is carried out in a wide range, whereas in a high frequency range, an orthogonal transform is possible in a narrow range. Therefore, even when quantization noise near an edge of an image is generated, spread of the noise in a color space can be suppressed. As a result, the noise is not easy to perceive.

Like a FlashPix file proposed by Eastman Kodak Co., a file format enabling storage of data sets having different characteristics in a file has also been proposed. Hierarchical data decomposed into multiple resolutions or density resolutions can be stored in such a file according to the FlashPix standard.

Meanwhile, in order to enhance sharpness of images, sharpness processing may be carried out on image data according to the following equation for unsharp masking:

$$S_{proc} = S_{org} + \beta \cdot (S_{org} - S_{us})$$

where $S_{proc}$: image data having been processed $S_{org}$: original image data $S_{us}$: unsharp masking image data and $\beta$ enhancement factor (1, for example).

Image data are transferred between various image servers or clients via a network. Therefore, information regarding sharpness enhancement processing (for example, the enhancement factor $\beta$ in the above equation) is attached to image data and the image data attached with the information are transferred. By attaching the information regarding sharpness processing (hereinafter called sharpness information) to the image data, a client which has received the image data can carry out appropriate sharpness processing on the image data, based on the sharpness information.

It is possible to attach the sharpness information to the image data converted into multiple resolution spaces. However, clients request only image data at an intermediate resolution in some cases. This is because image data at a highest resolution are not necessary for display on a comparatively low resolution monitor, and transfer of the image data at the highest resolution is time-consuming when a network is busy. In this case, since the sharpness information is transferred with the image data at resolutions up to the intermediate resolution, the client can carry out sharpness processing on the intermediate resolution data based on the sharpness information. However, the sharpness information has been set to correspond to the image data at the highest resolution, and the image data at the intermediate resolution do not have a high frequency component. Therefore, when the sharpness processing is carried out on the image data at the intermediate resolution based on the sharpness information, an image obtained thereby becomes more blurred than an image is intended to be. Furthermore, the sharpness information may have been set to correspond to not only the image data at the highest resolution but also image data at a predetermined resolution (½ of the highest resolution, for example). In this case, when the sharpness processing is carried out based on the sharpness information on image data at a resolution other than the predetermined resolution, high frequency component information may be lost or become too large in some cases. Therefore, sharpness of the image data to be obtained does not become appropriate.

SUMMARY OF THE INVENTION

The present invention has been created based on consideration of the above problems. An object of the present invention is to provide an image processing method and an image processing apparatus for carrying out appropriate sharpness processing on image data at a resolution other than a predetermined resolution for which sharpness information has been set out of multiple-resolution image data, and also to provide a computer-readable recording medium storing a program to cause a computer to execute the image processing method.

An image processing method of the present invention is an image processing method of carrying out sharpness processing on image data at a desired resolution other than a predetermined resolution out of multiple-resolution image data obtained by converting image data into multiple resolution spaces and attached with sharpness information regarding sharpness processing to be carried out on the multiple-resolution image data upon reproduction of the image data at the predetermined resolution. The image processing method comprises the steps of:

determining sharpness processing to be carried out on the image data at the desired resolution, based on the desired resolution and the sharpness information; and obtaining processed image data by carrying out the determined sharpness processing on the image data at the desired resolution.

The phrase "attached with sharpness information" means not only recording sharpness information in a header or the like of a file storing the multiple-resolution image data, but also recording the sharpness information in a file separate from a file storing the multiple-resolution image data and correlating the file storing the image data to the file storing the sharpness information.

As the "sharpness information", not only an enhancement factor in unsharp masking, but also information representing a frequency characteristic of the image data, such as a function representing the enhancement factor and information regarding an image generating apparatus from which the image data have been obtained or an image reproducing apparatus for reproducing the processed image data, can be included.

An image processing apparatus of the present invention is to carry out the image processing method of the present invention, and comprises:

determination means for determining sharpness processing to be carried out on image data at the desired resolution, based on the desired resolution and the sharpness information; and sharpness processing means for obtaining processed image data by carrying out the determined sharpness processing on the image data at the desired resolution.

The predetermined resolution may be a highest resolution of the image data.

It is preferable for the sharpness information to include a characteristic value of a filter for converting the image data into multiple resolution spaces.

It is preferable for the sharpness processing to cause sharpness at a predetermined frequency included in a frequency band of 0.5~2.0 cycles/mm of an image reproduced from the processed image data to approximately agree with sharpness at the predetermined frequency of the image data at the predetermined resolution on which the sharpness processing is carried out based on the sharpness information.

Furthermore, the image processing method of the present invention may be provided as a program for causing a computer to execute the image processing method recorded in a computer-readable recording medium.

According to the present invention, based on a desired resolution and the sharpness information attached to image data at multiple resolutions, sharpness processing to be carried out on the image data at the desired resolution is determined and the determined sharpness processing is carried out on the image data at the desired resolution. Therefore, desired sharpness processing can be carried out on image data at a resolution other than the predetermined one. As a result, by reproducing the processed image data, an image having appropriate sharpness and creating no visual discomfort can be obtained.

BRIEF DESCRIPTION OF THE DRAWINGS

FIG. 1 is a schematic block diagram showing a configuration of an image processing apparatus according to an embodiment of the present invention;

FIGS. 2a, 2b and 2c are diagrams showing the cases where original image data are wavelet-transformed and coded in each hierarchical level;

FIG. 3 is a flow chart showing processing carried out by the image processing apparatus according to the above embodiment;

DESCRIPTION OF THE PREFERRED EMBODIMENT

Figure 4A:
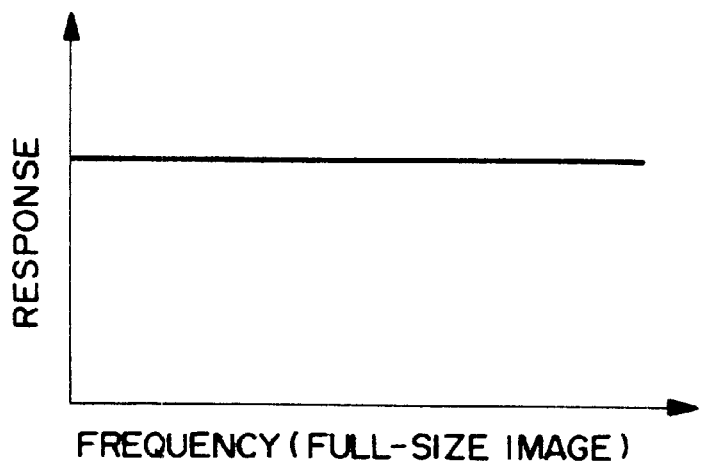
FIGS. 4a, 4b and 4c show frequency characteristics of a full-size image, a ½ image, and an enhanced frequency with an enhancement factor β.

Hereinafter, an embodiment of the present invention will be explained with reference to the accompanying drawings.

FIG. 1 is a schematic block diagram showing a configuration of an image processing apparatus according to the embodiment. As shown in FIG. 1, the image processing apparatus is connected to an image server 10 via a network 11. The image server 10 stores a coded image file F generated through coding which will be described later. The image processing apparatus comprises image file reading means 1 for reading, via the network 11, coded image data S0 at resolutions up to a desired resolution from the coded image file F stored in the image server 10 and sharpness processing information H recorded in a header of the coded image file F, decompression means 2 for obtaining restored image data S1 by decompressing the coded image data S0, parameter setting means 3 for setting a parameter P of sharpness processing carried out on the restored image data S1 based on the sharpness processing information H recorded in the header, sharpness processing means 4 for obtaining processed image data S2 by carrying out sharpness processing on the restored image data S1 based on the parameter P having been set by the parameter setting means 3, and reproduction means 5 such as a printer or a monitor for reproducing the processed image data S2.

The coded image file F is stored in the image server 10 in the form of hierarchical data generated by decomposing original image data in the following manner. As shown in FIG. 2(a), the original image data to be coded are subjected to wavelet transform and decomposed into 4 sets of data at multiple resolutions, namely LL1, HL0, LH0, and HH0. The data LL1 represents an image whose width and height are ½ of those of an image represented by the original image data, and the data HL0, LH0 and HH0 respectively represent images of a vertical edge component, a horizontal edge component, and a diagonal edge component. In this embodiment, as a wavelet base function for wavelet transform, (½, ½) is used. As shown in FIG. 2(b), 4 sets of data LL2, HL1, LH1 and HH1 are obtained through wavelet transform on the data LL1. The data LL2 represents an image whose width and height are ½ of those of the data LL1, and the data HL1, LH1 and HH1 represent images of vertical, horizontal and diagonal edge components of the data LL1 respectively. The wavelet transform is repeated a desired number of times on data LL obtained at each wavelet transform, and data at multiple resolutions are thereby obtained.

Thereafter, as shown in FIG. 2(c), the data at each resolution are coded, and the coded data are recorded as the hierarchical data in the coded image file F.

The header of the coded image file F includes, as the sharpness processing information H, an enhancement factor β used in sharpness processing on restored image data at a highest resolution obtained by decoding the hierarchical data coded in the above manner. The enhancement factor β is the enhancement factor in an unsharp masking equation (1) below:

$$Sproc = Sorg + \beta(Sorg - Sus) \qquad (1)$$

$$Sus = \Sigma Sorg/M$$

where Sproc: image data on which unsharp masking has been carried out

Sorg: original image data

Sus: unsharp masking image data

β: enhancement factor, and

M: smoothing filter.

In this embodiment, the enhancement factor β is set to 1.

Processing carried out in the image processing apparatus according to this embodiment will be explained next. FIG. 3 is a flow chart showing processing carried out by the image processing apparatus. In this embodiment, coded image data at all resolutions included in the coded image file F are not necessarily read, but the coded image data S0 at a ½ resolution (¼ in terms of area) are read, for example, depending on a state of a communication line of the network 11 and on the kind or performance of the reproduction means 5. At a step S1, the coded image data S0 up to the ½ resolution and the sharpness processing information H are input by the image file reading means 1 from the image server 10 via the network 11 to the image processing apparatus. The coded image data S0 are decompressed by the decompression means 2 (step S2) and the restored image data S1 representing the image at the resolution ½ of the highest resolution are obtained. The sharpness processing information H is input to the parameter setting means 3 and the parameter P is set (step S3). The setting of the parameter P is carried out as follows.

Figure 4B:
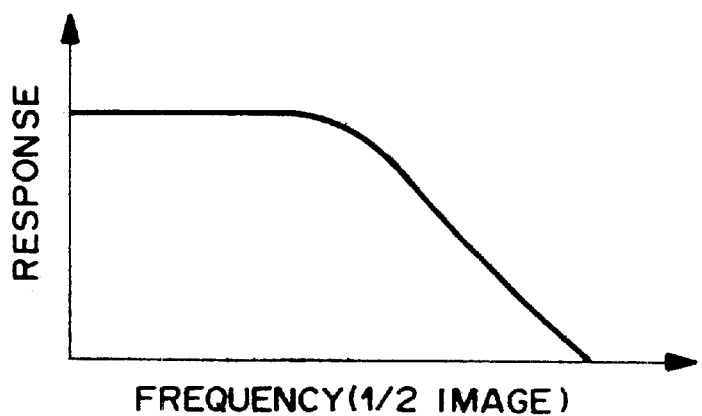

Among the coded image data included in the coded image file F, an image represented by the highest resolution data (hereinafter called a full-size image) is assumed to have a frequency characteristic shown in FIG. 4(a) which is 1 in all frequency bands. By carrying out wavelet transform on the original image data based on the wavelet base function described above, a frequency characteristic of the image at the resolution ½ of the highest resolution (hereinafter called a ½ image) is found. This frequency characteristic can be found analytically by carrying out Fourier transform on the wavelet base function. The frequency characteristic of the ½ image found in this manner is shown in FIG. 4(b). Likewise, a frequency characteristic of enhanced sharpness for the case of β=1 in the above equation (1) is found analytically. In other words, a function r(f) is obtained by Fourier transform of the smoothing filter M for finding the unsharp masking image data Sus, and a frequency characteristic R of the enhanced sharpness, which is shown in FIG. 4(c), can be found based on the function r(f) by using the following equation (2):

$$R = 1 + \beta \times (1 - r(f)). \quad (2)$$

Figure 5A:
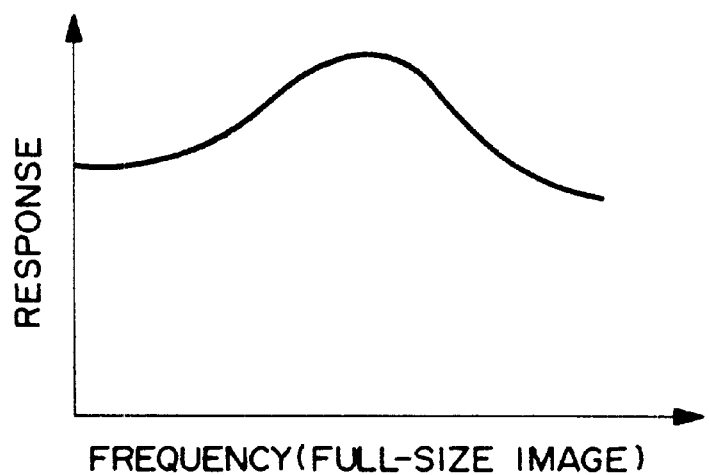
FIGS. 5a, 5b and 5c show frequency characteristics of the full-size image and the ½ image having been sharpness-processed with the enhancement factor β, and a difference therebetween.
Figure 5B:
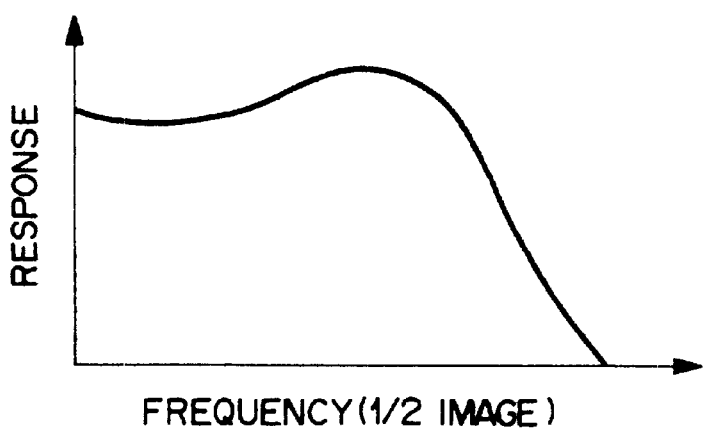
Figure 5C:
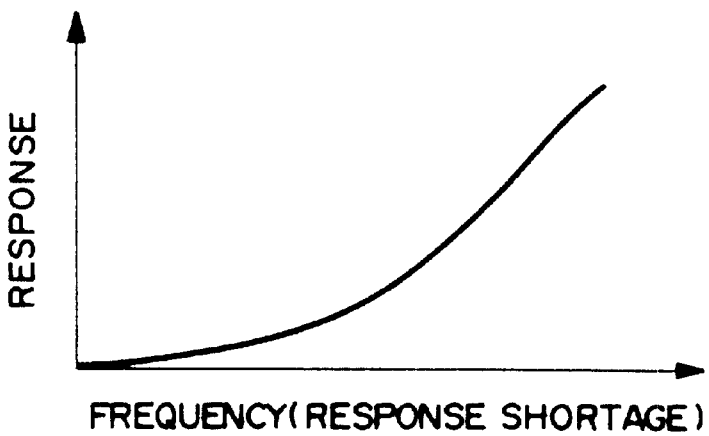

For the full-size image and the ½ image, frequency characteristics of images on which sharpness processing has been carried out by letting β=1 in the equation (1) are found, and shown in FIGS. 5(a) and 5(b). From FIGS. 5(a) and 5(b), the ½ image on which sharpness processing has been carried out by letting β=1 has a lower response in a high frequency range as shown in FIG. 5(c) than the full-size image on which sharpness processing has been carried out by letting β=1. Sensitivity to sharpness is visually highest in a frequency band of 0.5~2.0 cycles/mm. Therefore, attention is paid to this frequency band of 0.5~2.0 cycles/mm and a response shortage K1 in this frequency band (in this embodiment, 1 cycle/mm) is found from FIG. 5(c).

Figure 4C:
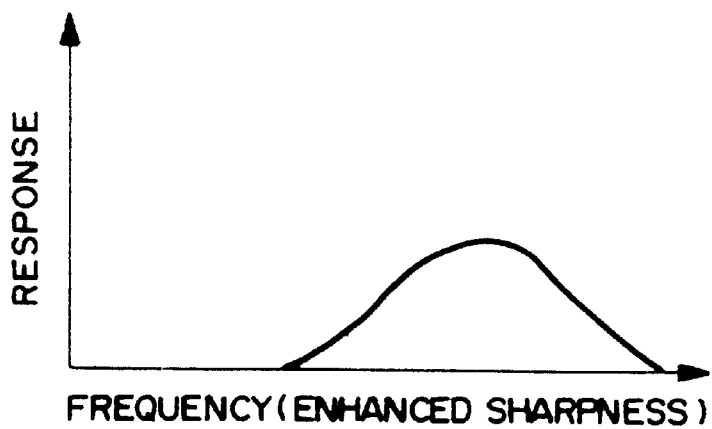

A frequency characteristic K2 at 1 cycle/mm in the enhanced sharpness shown in FIG. 4(c) is then found. From the response shortage K1 and the frequency characteristic K2 in the enhanced sharpness, an enhancement factor β1 for sharpness processing using the equation (1) on the ½ image is found by using the following equation (3):

$$\beta 1 = 1 + 1 \times (K1/K2). \quad (3)$$

In this embodiment, if the response shortage K1 at the frequency of 1 cycle/mm is 0.05 and if the frequency characteristic K2 of the enhanced sharpness at the same frequency is 0.2, β1=1+1×(0.05/0.2)=1.25 is found as the enhancement factor β1 for the ½ image. The enhancement factor β1 found in this manner is set as the parameter P.

Using the parameter P set by the parameter setting means 3, the sharpness processing means 4 carries out sharpness processing on the restored image data S1 according to the above equation (1), and the processed image data S2 are obtained (step S4). The processed image data S2 are input to the reproduction means 5 and reproduced as a visible image (step S5).

As has been described above, according to this embodiment, since sharpness processing is carried out on the ½ image by using the enhancement factor β1 obtained by correcting the enhancement factor β set for the full-size image, frequency characteristics approximately agree between the ½ image on which the sharpness processing has been carried out by using β1 and the full-size image on which the sharpness processing has been carried out by using β. In this manner, visual impression of the sharpness of both images can be made almost the same and the image having appropriate sharpness without creating visual discomfort can be reproduced.

In the above embodiment, the sharpness processing has been carried out on the ½ image at the resolution ½ of the highest resolution. However, the present invention is not limited to this example, and sharpness processing can be carried out in the same manner on an image at a resolution ½$^n$ of the highest resolution by finding the enhancement factor β1 therefor and the enhancement factor β, based on the resolution of the image to be reproduced.

Furthermore, in the above embodiment, the sharpness processing information H is the enhancement factor β of sharpness processing on the restored image data at the highest resolution. However, the present invention is not limited to this example, and an enhancement factor β of sharpness processing on restored image data representing an image at a resolution other than the highest resolution can be attached to the coded image file F as the sharpness processing information H. For example, since the highest resolution data has too large a data size when restored image data are actually used, restored image data representing an image at a resolution ½ of the highest resolution are frequently used. Therefore, an enhancement factor (called β2) of sharpness processing on the restored image data representing the image at the resolution ½ of the highest (½ image) may be attached to the coded image file F as the sharpness processing information H.

In this case, when sharpness processing is carried out on an image at a resolution lower than that of the ½ image (for example, an image at a resolution ¼ of the highest resolution; called ¼ image), the full-size image and the ½ image in the above embodiment are replaced by the ½ image and the ¼ image respectively. A frequency characteristic K2 of the enhanced sharpness at a frequency (for example, 1 cycle/mm) for the case of sharpness processing using β2 is found from the equation (2) using the enhancement factor β2 and the function r(f) which is obtained by carrying out Fourier transform on the smoothing filter M in the equation (1). From the frequency characteristics of the ½ image and the ¼ image on which sharpness processing has been carried out by using β2, the response shortage K1 of the frequency characteristic at the frequency is found. From the frequency characteristic K2 of the enhanced sharpness and the response shortage K1, an enhancement factor for sharpness processing on the ¼ image is set based on the equation (3). In this manner, the frequency characteristics approximately agree between the ½ image on which sharpness processing has been carried out by using β2 and the ¼ image on which sharpness processing has been carried out by using an enhancement factor β2'.

On the contrary, in the case where sharpness processing is carried out on the image (the full-size image) at the resolution higher than that of the ½ image (the highest resolution), the enhancement factor is determined in the following manner. First, the frequency characteristics of the full-size image and the ½ image on which sharpness processing has been carried out by using the enhancement factor β2 are found. In this case, as in FIG. 5(c) in the above-described embodiment, the ½ image has deficient response of a high frequency component when the full-size image is used as a reference, while the full-size image has excessive response in the high frequency component when the ½ image is used as the reference. Therefore, the deficiency K1 in the equation (3) is replaced by an excess K1' and an enhancement factor β3 for sharpness processing on the full-size image is set by using the following equation (3'):

$$\beta 3 = 1 + 1 \times (-K1'/K2). \tag{3'}$$

When the excess K1' at the frequency of 1 cycle/mm is 0.05, and the frequency characteristic K2 of the enhanced sharpness at the frequency of 1 cycle/mm is 0.2, the enhancement factor β3 =1+1×(−0.05/0.2)=0.75 is found for the full-size image. In this manner, the frequency characteristics of the ½ image on which the sharpness processing has been carried out by using the enhancement factor β2 and that of the full-size image on which the sharpness processing has been carried out by using the enhancement factor β3 approximately agree.

In the above embodiment, only the enhancement factor β of the image at the highest resolution is recorded in the header of the coded image file F. However, the enhancement factor β1 for each resolution may be found in advance and recorded in the header of the coded image file F. At this time, in response to the resolution of the coded image data read by the image processing apparatus, the enhancement factor β1 corresponding to this resolution is read and sharpness processing is carried out by using this factor. In this case, only the enhancement factor β1 at a representative frequency (for example, at 1 cycle/mm) may be recorded. Alternatively, the enhancement factor β1 at a plurality of frequencies in a range of 0.5~0.2 cycles/mm may be recorded. In the case where the enhancement factor β corresponding to only the highest-resolution image data is recorded at a plurality of frequencies, the enhancement factor β1 corresponding to each frequency is found by the parameter setting means 3 in response to the resolution of the coded image data read by the image processing apparatus, and sharpness processing is carried out by applying an average of the values of the factor at the plurality of frequencies to the equation (1).

In the above embodiment, the enhancement factor β is recorded in the header of the coded image file F. However, instead of the enhancement factor β, a wavelet base function in the wavelet transform may be recorded in the header of the coded image file F. In this case, the base function is read together with the coded image data S0 by the image processing apparatus, and the enhancement factor β1 is found by using the frequency characteristic based on the base function, as shown in FIGS. 4 and 5.

In the case where the coded image data S0 at a comparatively low resolution are reproduced through sharpness processing and interpolation enlargement, the enhancement factor β1 is preferably found by considering image quality degradation due to the interpolation enlargement.

In the above embodiment, only the cases where β is positive, such as β=1, have been explained. However, β may be negative. In this case, the sharpness processing is not sharpness enhancement processing, but sharpness reduction processing. The enhancement factor β may be a function rather than a value.

In the above embodiment, unsharp masking has been carried out by using the equation (1) on the restored image data S1. However, the present invention is not limited to this example, and any processing which can change the frequency characteristic of the restored image data S1 can be used. In this case, the parameter is defined for the processing.

As the parameter, not only the information H directly related to the sharpness processing but also the name of an apparatus or the like, such as the name of an apparatus which has generated the coded image or the name of an apparatus for reproducing an image, may be used. In this case, the frequency characteristic of an image is found according to the name of the apparatus or the like and the sharpness processing to be carried out on the restored image data S1 is determined based on the frequency characteristic having been found and the resolution of the image to be reproduced.

In the above embodiment, the sharpness processing information such as the enhancement factor β is recorded in the header of the coded image file F. However, the sharpness processing information H may be recorded in a file separate from the coded image file F and stored in the image server 10. In this case, the file storing the sharpness processing information H is read together with the coded image data S0, and the sharpness processing is carried out on the restored image data S1 by determining the parameter in the same manner as in the above embodiment.

In the above embodiment, the sharpness processing has been carried out on the coded image data obtained by coding of wavelet-transformed original data and recorded in the coded image file F. However, as in the case of the FlashPix format described above, if original image data are stored in a hierarchy of resolution in an image file, the same processing as has been described above can be carried out.

What is claimed is:

1. An image processing method of carrying out sharpness processing on image data at a desired resolution other than a predetermined resolution out of multiple-resolution image data obtained by converting image data into multiple resolution spaces and attached with sharpness information regarding sharpness processing to be carried out on the multiple-resolution image data upon reproduction of the image data at the predetermined resolution, the image processing method comprising the steps of:

determining sharpness processing to be carried out on the image data at the desired resolution, based on the desired resolution and the sharpness information; and obtaining processed image data by carrying out the determined sharpness processing on the image data at the desired resolution, wherein the determined sharpness processing is sharpness processing causing sharpness at a predetermined frequency included in a frequency band of 0.5~2.0 cycles/mm of an image reproduced from the processed image data to approximately agree with sharpness at the predetermined frequency of the image data at the predetermined resolution on which the sharpness processing is carried out based on the sharpness information.

2. An image processing method as claimed in claim 1, wherein the predetermined resolution is a highest resolution.

3. An image processing method as claimed in claim 1, wherein the sharpness information includes a characteristic value of a filter for converting the image data into multiple resolution spaces.

4. An image processing apparatus for carrying out sharpness processing on image data at a desired resolution other than a predetermined resolution out of multiple-resolution image data obtained by converting image data into multiple resolution spaces and attached with sharpness information regarding sharpness processing to be carried out on the multiple-resolution image data upon reproduction of the image data at the predetermined resolution, the image processing apparatus comprising:

determination means for determining sharpness processing to be carried out on the image data at the desired resolution, based on the desired resolution and the sharpness information; and sharpness processing means for obtaining processed image data by carrying out the determined sharpness processing on he image data at the desired resolution, wherein the sharpness processing means determines the sharpness processing in order to cause sharpness at a predetermined frequency included in a frequency band of 0.5~2.0 cycles/mm of an image reproduced from the processed image data to approximately agree with sharpness at the predetermined frequency of the image data at the predetermined resolution on which the sharpness processing is carried out based on the sharpness information.

5. An image processing apparatus as claimed in claim 4, wherein the predetermined resolution is a highest resolution.

6. An image processing apparatus as claimed in claim 4, wherein the sharpness information include a characteristic value of a filter for converting the image data into multiple resolution spaces.

7. A computer readable recording medium storing a program to cause a computer to execute an image processing method of carrying out sharpness processing on image data at a desired resolution other than a predetermined resolution out of multiple-resolution image data obtained by converting image data into multiple resolution spaces and attached with sharpness information regarding sharpness processing to be carried out on the multiple-resolution image data upon reproduction of the image data at the predetermined resolution, the program comprising the procedures of:

determination of sharpness processing to be carried out on the image data at the desired resolution, based on the desired resolution and the sharpness information; and acquisition of processed image data by carrying out the determined sharpness processing on the image data at the desired resolution, wherein the procedure of sharpness processing determination is a procedure of determining sharpness processing causing sharpness at a predetermined frequency included in a frequency band of 0.5~2.0 cycles/mm of an image reproduced from the processed image data to approximately agree with sharpness at the predetermined frequency of the image data at the predetermined resolution on which the sharpness processing is carried out based on the sharpness information.

8. A computer-readable recording medium as claimed in claim 7, wherein the predetermined resolution is a highest resolution.

9. A computer-readable recording medium as claimed in claim 7, wherein the sharpness information includes a characteristic value of a filter for converting the image data into multiple resolution spaces.

* * * * *